UNITED STATES PATENT OFFICE.

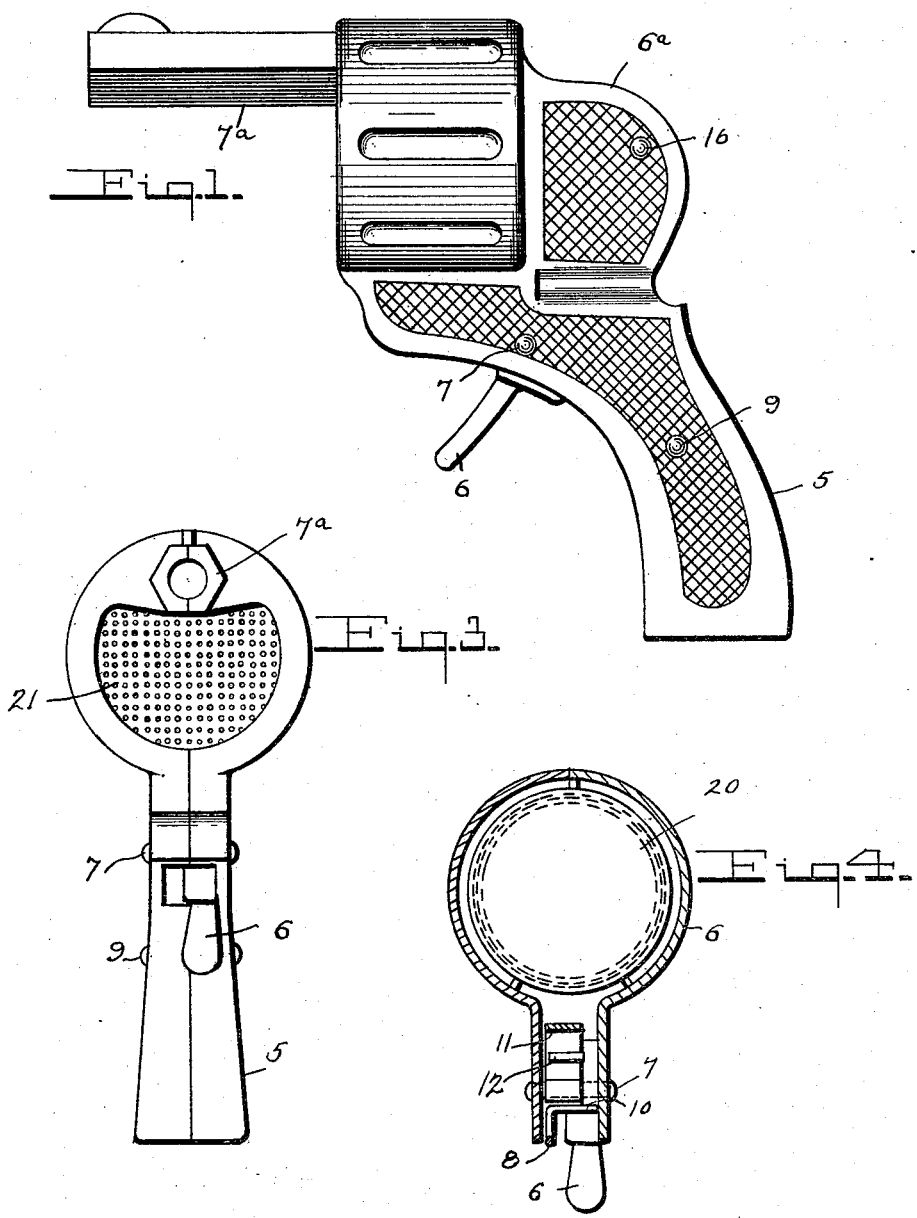

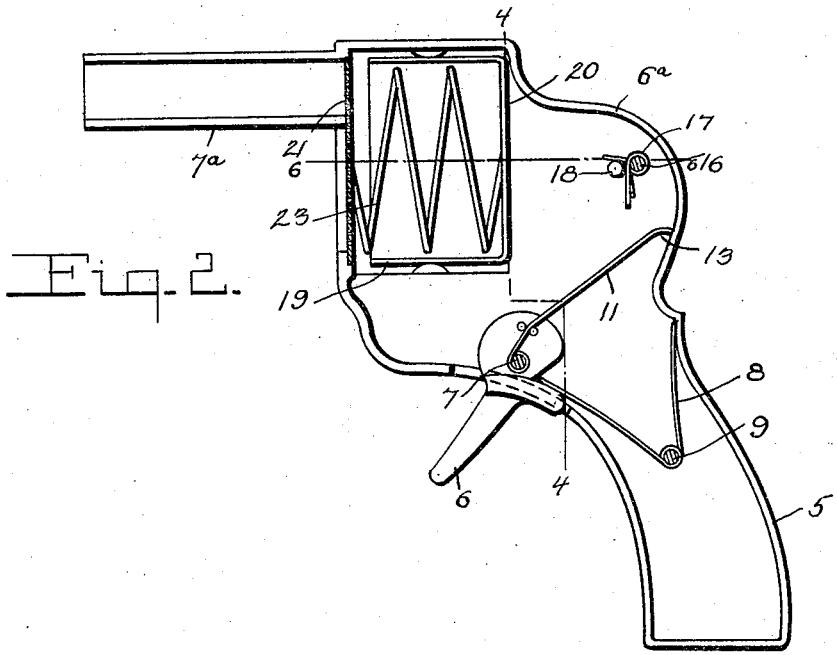

CONRAD O. PICKL, OF MILWAUKEE, WISCONSIN.

TOY.

1,188,315.  Specification of Letters Patent.  Patented June 20, 1916.

Application filed January 22, 1916. Serial No. 73,627.

*To all whom it may concern:*

Be it known that I, CONRAD O. PICKL, a subject of the Emperor of Germany, residing at Milwaukee, in the county of Milwaukee and State of Wisconsin, have invented certain new and useful Improvements in Toys; and I do hereby declare the following to be a full, clear, and exact description of the invention, such as will enable others skilled in the art to which it appertains to make and use the same.

This invention relates to toys, and more particularly to a toy pistol.

The invention has for its primary object to provide an attractive and harmless toy embodying means for effectively producing the sharp report of a pistol.

With this and other objects in view, the invention consists in the novel construction, combination and arrangement of parts as will be hereinafter specifically described, claimed and illustrated in the accompanying drawings, in which:

Figure 1 represents a side elevation of the improved toy, Fig. 2 represents a longitudinal sectional view therethrough, Fig. 3 represents a front elevation of the toy pistol, Fig. 4 represents a fragmental sectional view on the line 4—4 of Fig. 2, Fig. 5 represents a perspective view of the trigger, spring carried thereby and the spring actuated bell crank arranged in the handle of the toy. Fig. 6 represents a longitudinal sectional view on the line 6—6 of Fig. 2.

Referring to the drawings in detail, wherein similar reference numerals designate corresponding parts throughout the several views, the numeral 5 indicates a handle having an enlarged upper end 6ª constructed to represent the barrel of a revolver or other fire arm and to which is secured the barrel 7ª of hollow formation and communicating with the interior of the handle 5.

A trigger 6 is pivotally secured by a pin 7 to the upper portion of the handle 5 and is normally retained in forwardly extended position by the tension of a substantially V-shaped spring 8 supported centrally by a pin 9 engaged through the side walls of the handle 5 and engaged at its opposite ends with the rear wall of the handle and a rearwardly projecting extension 10 of the trigger 6.

A leaf spring 11 is secured at one end to the pivot pin 7, extends between the pins 12 and is curved at its opposite end, as indicated at 13. The curved end 13 of the leaf spring 11 is normally retained in rearwardly extended position by the tension of the V-shaped spring 8 and is adapted to engage a plate 15 pivotally secured in the upper portion 6 of the handle upon a pin 16 secured transversely in the side walls of the handle. The plate 15 is normally retained in engagement with a stop pin 18 by the tension of a spring 17, having the central portion coiled about the stem 16, engaged at one end with the stop pin 18 and at its opposite end with the plate 15.

A cylindrical drum 19 formed of celluloid, or other resonant material, is arranged in the upper portion 6 of the hollow handle 5 and the rear wall 20 thereof is adapted to be engaged by the curved extremity 13 of the leaf spring 11. A circular perforate partition 21 is arranged in the upper portion of the handle 5 adjacent the barrel 7ª and is engaged by a spring 23, the tension of which normally retains the rear wall 20 of the drum 19 in rearwardly extended position.

In operation, the toy is held in the hand of the operator by the handle 5 and actuated by pulling rearwardly upon the trigger 6, which effects a forward movement of the upper curved end 13 of the leaf spring 11. During its forward movement the leaf spring 11 is engaged with the spring actuated plate 15 and is retarded to a certain extent until the spring 11 is flexed sufficiently to pass the plate. The curved end 13 of the spring being free moves forwardly, striking against the end wall 20 of the drum 19 and resulting in a loud report.

What I claim is:

1. A toy including a handle, a barrel communicating with said handle, a drum arranged in the upper portion of said handle, a trigger pivotally mounted in said handle, a spring carried by said trigger and movable against the end wall of said drum, and means for retarding the forward movement of said spring.

2. A toy including a handle having an enlarged upper end, a hollow barrel communicating with the upper portion of said handle, a drum mounted in said handle and including a rear end wall, a trigger pivotally mounted in said handle, a spring carried by said trigger having a curved upper end movable against the end wall of said drum, and means for retarding the forward movement of said spring.

3. A toy including a handle, a barrel communicating with said handle, a hollow drum disposed in the upper portion of said handle and having an open end disposed toward said barrel, a spring arranged in said drum and engaging the rear wall thereof, a trigger pivotally mounted in said handle, a spring carried by said trigger having its curved upper end movable against the rear wall of said drum, and means for retarding the forward movement of said spring.

4. A toy including a handle having an enlarged upper end, a barrel communicating with said handle, a drum mounted in the upper portion of said handle and including a rear end wall, a trigger pivotally mounted in said handle, a spring carried by said trigger movable against the rear wall of said drum, and means for retarding the forward movement of the free end of said spring.

5. A toy including a hollow handle having an enlarged upper end, a hollow barrel communicating with the upper portion of said handle, a drum arranged in the upper portion of said handle having an open forward end and a closed rear end, a trigger pivotally mounted in said handle, means normally retaining said trigger in forwardly extended position, a spring carried by said trigger having its curved upper end movable against the rear wall of said drum, and means for retarding the forward movement of the free end of said spring, said retarding means including a plate pivotally secured to the upper portion of said handle and spring means normally retaining said plate in the path of said spring.

In testimony whereof I affix my signature in presence of two witnesses.

CONRAD O. PICKL.

Witnesses:
IGNATZ CZERWINSKI,
SOPHIA ANDRASZCZYK.

Copies of this patent may be obtained for five cents each, by addressing the "Commissioner of Patents, Washington, D. C."